US009436772B2

(12) United States Patent
Cole et al.

(10) Patent No.: US 9,436,772 B2
(45) Date of Patent: Sep. 6, 2016

(54) APPENDING A UNIFORM RESOURCE IDENTIFIER (URI) FRAGMENT IDENTIFIER TO A UNIFORM RESOURCE LOCATOR (URL)

(75) Inventors: Charles A. Cole, Cary, NC (US); Clark A. Dudek, Raleigh, NC (US); Adrian X. Rodriguez, Durham, NC (US); Eric Woods, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 599 days.

(21) Appl. No.: 13/590,686

(22) Filed: Aug. 21, 2012

(65) Prior Publication Data

US 2014/0059420 A1 Feb. 27, 2014

(51) Int. Cl.
*G06F 17/00* (2006.01)
*G06F 17/30* (2006.01)

(52) U.S. Cl.
CPC .............................. *G06F 17/30882* (2013.01)

(58) Field of Classification Search
CPC .......................... G06F 17/30873; H04L 67/02
USPC ................................................ 715/234, 200
See application file for complete search history.

(56) References Cited

U.S. PATENT DOCUMENTS 6,222,541 B1 * 4/2001 Bates et al. ................... 715/786
7,555,564 B2 * 6/2009 Gimson et al. ............... 709/245
8,042,036 B1 10/2011 Sharma et al.
8,468,145 B2 * 6/2013 Fedorynski ....... G06F 17/30864 707/709
2003/0177175 A1 * 9/2003 Worley ............ G06F 17/30902 709/203
2004/0139169 A1 7/2004 O' Brien et al.
2006/0075357 A1 * 4/2006 Guido et al. .................. 715/784
2008/0104269 A1 * 5/2008 Vitanov ............ G06F 17/30902 709/236
2008/0155110 A1 * 6/2008 Morris .................. H04L 61/301 709/230
2009/0063946 A1 3/2009 Balasubramanian
2010/0146387 A1 * 6/2010 Hoover ......................... 715/702
2010/0332965 A1 12/2010 Carraher et al.

* cited by examiner

*Primary Examiner* — Manglesh M Patel

(74) *Attorney, Agent, or Firm* — Law Office of Jim Boice

(57) ABSTRACT

A method, computer program product, and/or system dynamically appends a Uniform Resource Identifier (URI) fragment identifier to a Uniform Resource Locator (URL). A web browser on a client device displays a webpage, and accesses the HyperText Markup Language (HTML) coding for the webpage. HTML identification attributes are detected for the content that is being rendered within the web browser. A URI fragment identifier corresponding to the HTML identification attribute that is being rendered at the top of the web browser window is determined and is appended to the end of the URL of the webpage that is displayed in the URL box of the web browser. Detection of the content that is being rendered at the top of the web browser window occurs responsive to a command to scroll to a new section of the webpage.

19 Claims, 5 Drawing Sheets

URL UPDATING EXAMPLE 400 www.webpage.com/Information 402 www.webpage.com/Information#Fragment_Identifier 404

URL UPDATING EXAMPLE
400 www.webpage.com/Information
402

404

APPENDING A UNIFORM RESOURCE IDENTIFIER (URI) FRAGMENT IDENTIFIER TO A UNIFORM RESOURCE LOCATOR (URL)

FIELD OF THE INVENTION

The present invention relates generally to the field of Uniform Resource Locator (URL) browsing, and more particularly to dynamically appending a Uniform Resource Identifier (URI) fragment identifier to a URL.

BACKGROUND OF THE INVENTION

Uniform Resource Identifiers (URIs) are a specific string of characters which are used to identify a specific name of a resource. A Uniform Resource Locator (URL) is a specific type of URI which references a resource on the internet. URIs are comprised of mechanisms known as "fragment identifiers," which identify various sections of a webpage. A fragment identifier is a string of characters that references a resource that is subordinate to another resource. Fragment identifiers for a webpage specify the source webpage and provide navigational instructions for accessing the webpage. In a URL, a fragment identifier is indicated by a hash mark (#) appended to the end of the URL, and is typically used to identify a section of the webpage referred to by the URL. In a webpage, a fragment identifier may reference a particular topic section and heading within the HyperText Markup Language (HTML) of the webpage. HTML documents are composed of HTML elements that specify attributes in the document.

SUMMARY

Embodiments of the present invention disclose a method, computer program product, and system for dynamically appending a Uniform Resource Identifier (URI) fragment identifier to a Uniform Resource Locator (URL). A web browser on a client device is displaying a webpage, and is accessing the HyperText Markup Language (HTML) coding for the webpage. HTML identification attributes are detected for the content that is being rendered within the web browser. A URI fragment identifier corresponding to the HTML identification attribute that is being rendered at the top of the web browser window is determined and is appended to the end of the URL of the webpage that is displayed in the URL box of the web browser. In an embodiment, the detection of the content that is being rendered at the top of the web browser window occurs responsive a command to scroll to a new section of the webpage. In another embodiment, the URI fragment identifier corresponding to the HTML identification attribute that is being rendered closest to the cursor position in the web browser of the client device is appended to the end of the URL.

DETAILED DESCRIPTION

Figure 1:
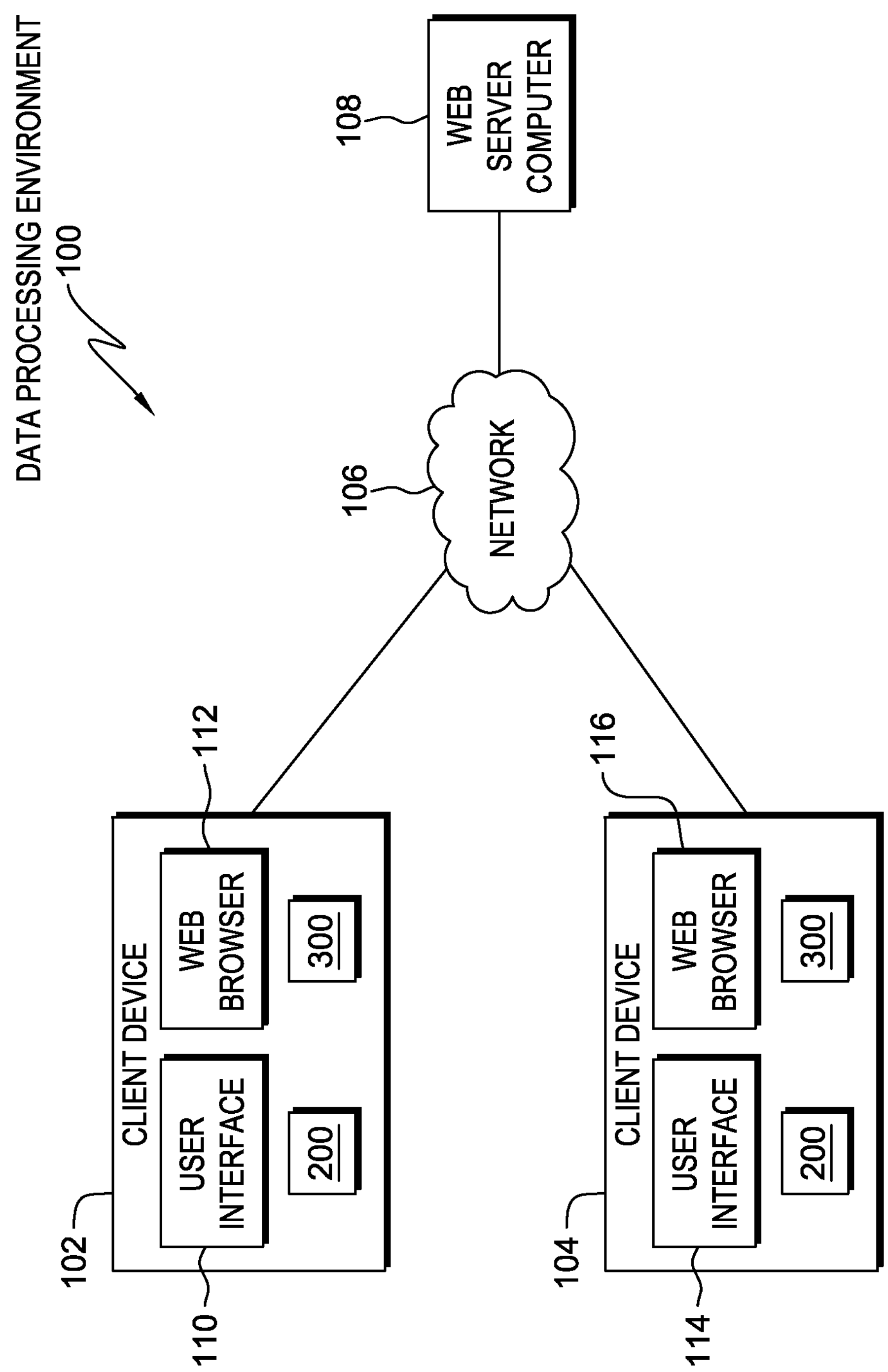
FIG. 1 is a pictorial representation of a distributed data processing environment in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating data processing environment 100, in accordance with one embodiment of the present invention.

Data processing environment 100 includes client device 102, client device 104, network 106, and web server computer 108. Client device 102 may be a workstation, personal computer, personal digital assistant, mobile phone, or any other device capable of executing program instructions. User interface 110 is located on client device 102 and may exist in the form of operating system software, which may be Windows®, LINUX®, or other systems that include application software such as internet applications and web browsers. In one embodiment, user interface 110 includes applications which allow client device 102 to send and receive URL links through network 106. Web browser 112 is located on client device 102 and allows client device 102 to access web content located on web server computer 108 through network 106. In one embodiment, client device 104 can have the same functionality and characteristics as client device 102. Client device 104 includes a user interface 114 and a web browser 116 which share the same functionality as user interface 110 and web browser 112 on client device 102. In an embodiment, web browsers 112 and 116 include a URL box which displays the URL address of the webpage being displayed by web browser 112. The URL box in web browsers 112 and 116 allows respective users of client devices 102 and 104 to copy and paste URLs into the URL box. Each of client devices 102 and 104 include an instance of URL appending program 200 for appending a fragment identifier to a URL responsive to the depiction of a webpage in the respective web browser 112 or 116. In an embodiment, client devices 102 and 104 also each include an instance of URL updating program 300 for updating the fragment identifier appended to the URL responsive to an updated depiction of a webpage in web browser 112 or 116.

Data processing environment 100 includes network 106, which provides communication between devices such as, but not limited to client devices 102 and 104, and web server computer 108. Network 106 may include connections such as wiring, wireless communication link, fiber optic cables, and other forms of communication. Network 106 may allow elements of data processing environment 100 to access content through a plurality of methods, including the internet, an intranet connection, telecommunications service provider, local area connection, and others.

In one embodiment, web server computer 108 hosts web content being accessed by one or both of client devices 102 and 104. Web server computer 108 may include application servers, communications servers, database servers, and others. The web content located on web server computer 108 includes HyperText Markup Language (HTML) coding including fragment identifiers which can be accessed by URL appending program 200 and URL updating program 300.

Embodiments of the present invention recognize that a URL stays the same regardless of a user's position on a webpage. If a user would like to share a URL with a user of a different computer or device and reference a section of interest in the URL, the user must manually communicate the position of the section of interest. Some web pages have a built in table of contents at the top of the webpage which allow a user to navigate to a specific part of the webpage. When a user selects a section from the table of contents, the URL in the URL box is appended with a URI fragment identifier, which allows the user to copy the now amended URL and send it to others, thereby allowing a receiving user to view the pertinent section. However, if the user then manually navigates to a different section of the webpage, the URI fragment identifier which was appended to the URL will not change. This means that if the user subsequently copies the URL and sends it to another user, the URL will direct the other user to the section which was originally selected from the table of contents, as opposed to the section that the original user was viewing.

In one embodiment, URL appending program 200 appends a fragment identifier to a URL responsive to the depiction of a webpage in web browser, such as web browser 112 or 116. URL updating program 300 may be initiated when web browser 112 or 116 receives a command to scroll to a new section of the webpage. The result of URL updating program 300 is that the URL is appended with a new fragment identifier which corresponds to the section of the webpage that is being displayed by web browser 112 or 116. URL updating program 300 allows the URL to be constantly updated with the current position of the webpage in web browser 112 or 116.

URL appending program 200 and URL updating program 300 may be stored on Client device 102 and 104 in the form of program instructions. However, in other examples, the programs may be stored on remote storage devices, servers, or networked computer systems. Detailed implementation of programs 200 and 300 are discussed with regard to FIGS. 2 and 3 respectively.

Figure 5:
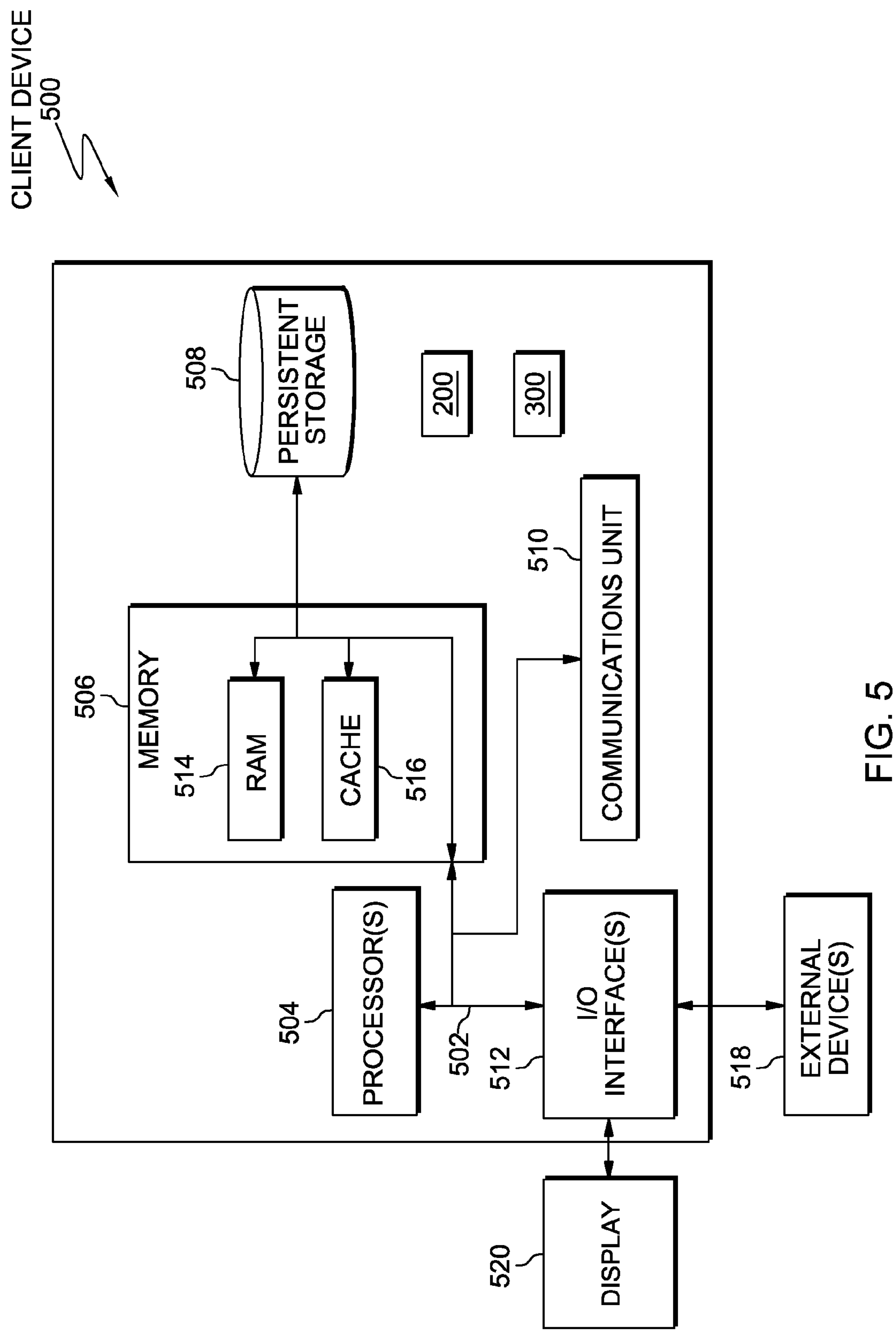
FIG. 5 depicts a block diagram of components of a client device executing programs as described with regard to FIGS. 2 and 3, in accordance with an embodiment of the present invention.

Client device 102 and 104 may include internal and external hardware components, as depicted and described in further detail with respect to FIG. 5.

Figure 2:
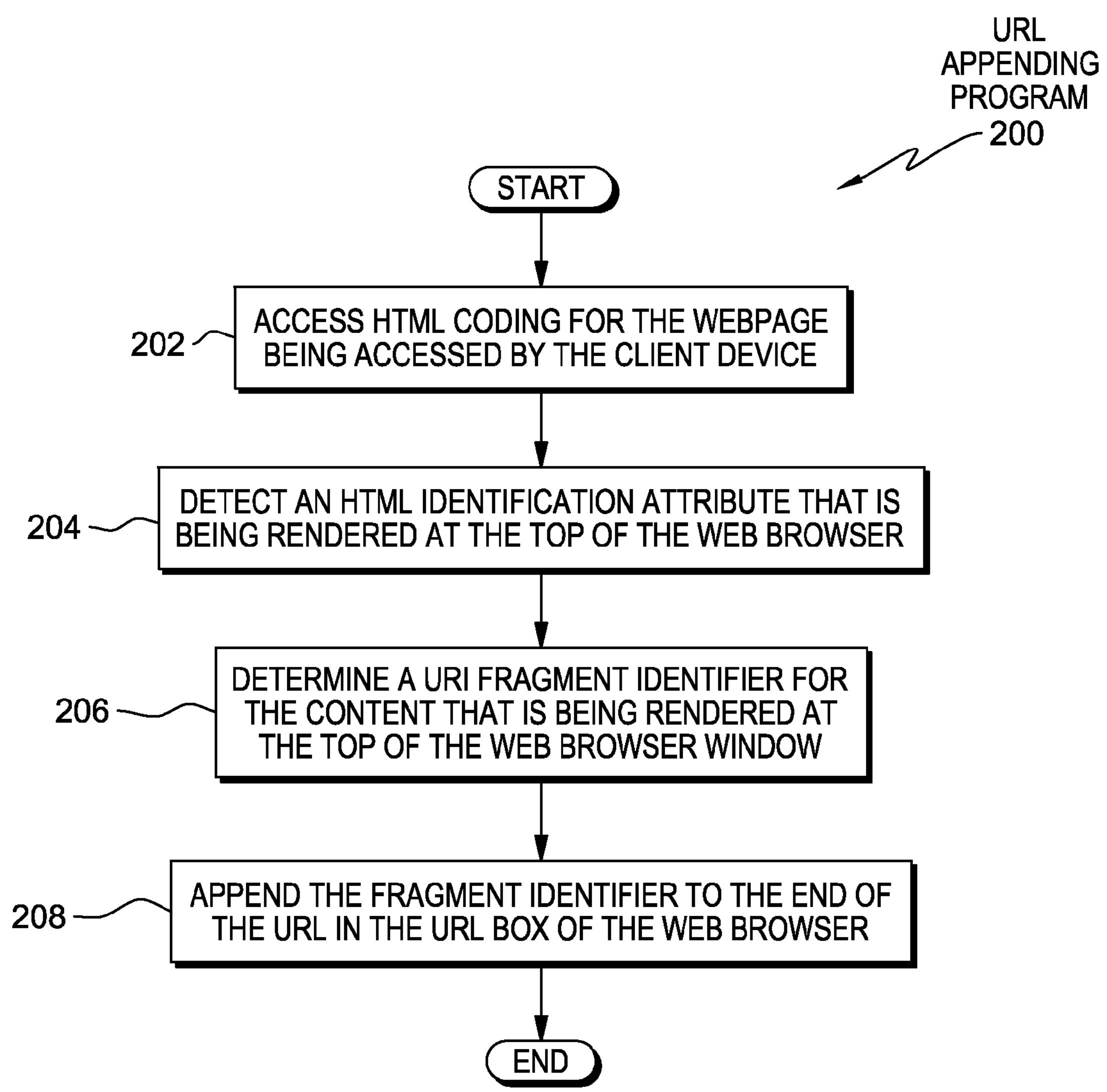
FIG. 2 is a flowchart depicting operational steps of a program for appending a fragment identifier to a URL responsive to the depiction of a webpage in a web browser in accordance with an embodiment of the present invention.

FIG. 2 is a flowchart depicting operational steps of URL appending program 200. URL appending program 200 executes while a webpage is being accessed by a client device.

In one example, client device 102 accesses a webpage on web server computer 108. In step 202, URL appending program 200 accesses HTML coding for the webpage being accessed by client device 102. Step 202 may be initiated when the webpage is opened in web browser 112. In step 204, URL appending program 200 detects an HTML identification attribute that is being rendered at the top of the web browser window. Each topic heading in the HTML code of a webpage may be defined in the HTML coding of the webpage. In an embodiment, the HTML identification attribute corresponds to a topic heading or section of the webpage being accessed by web browser 112. The HTML elements that URL appending program 200 detects can include, but are not limited to, body, div, and span elements. In another embodiment where there is not an HTML identification attribute being rendered at the top of the visible page, URL appending program 200 may detect the HTML identification element that is the closest to the top of the web browser window. For example, the HTML identification attribute that is closest to the top of the web browser window may be in the center of the web browser window. However, since it is the closest HTML identification attribute to the top of the web browser window, it is detected by URL appending program 200 in step 204.

In step 206, URL appending program 200 determines a URI fragment identifier for the content that is being rendered at the top of the web browser window. In an embodiment, the web browser window is the depiction of the webpage presented to the user from web browser 112. A URI fragment identifier may reference a particular topic section and heading within the HTML coding of the webpage. In an embodiment, the fragment identifiers may be used to reference topic headings in the webpage. In step 208, URL appending program 200 appends the fragment identifier to the end of the URL in the URL box of the web browser. The URL box of the web browser is the section of web browser 112 where the URL address is shown for the webpage being accessed by web browser 112. By appending the URL with the fragment identifier in the URL box of web browser 112, the user of client device 102 may copy the URL link and send it to a user on client device 104. In this example, the user on client device 104 may activate the link in web browser 116, and then be directed to the section of the page that the user on client device 102 is viewing. In one embodiment, a fragment identifier is indicated by a hash mark (#) appended to the end of the URL. For example, a section in a HTML document with the identification attribute of "Example" would be appended to the end of the URL as the URI fragment identifier #Example. Thus, URL appending program 200 may produce a URL link indicative of the browser position of the user on client device 102 at a given time.

Figure 3:
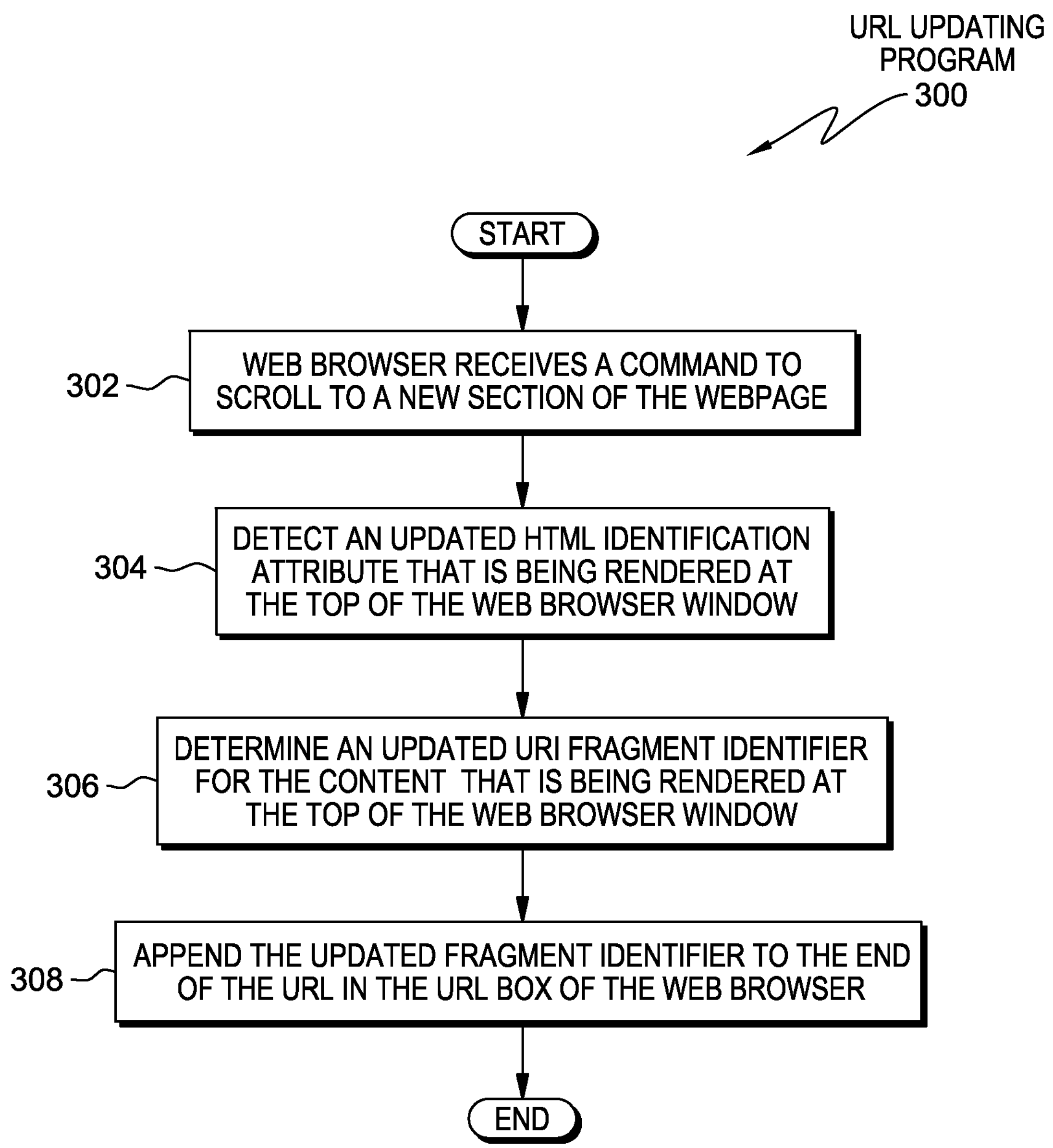
FIG. 3 is a flowchart depicting operational steps of a program for updating the fragment identifier appended to the URL responsive to an updated depiction of a webpage in a web browser in accordance with an embodiment of the present invention.

FIG. 3 is a flowchart depicting the operational steps of URL updating program 300. In one embodiment, URL updating program 300 updates the fragment identifier appended to the URL responsive to an updated depiction of a webpage in web browser 112 and 116. URL updating program 300 occurs after a URL has already been appended with a URI fragment identifier corresponding to an HTML identification attribute. URL updating program 300 may occur after URL appending program 200 has been completed.

In one embodiment, URL updating program 300 is initiated when the user of client device 102 scrolls up or down in web browser 112. In step 302, web browser 112 receives a command to scroll to a section of the webpage. Web browser 112 may send a notification of the change to URL updating program 300. In another embodiment, URL updating program 300 is a function of web browser 112, and web browser 112 calls this function. In yet another embodiment, URL updating program 300 may monitor the display window of web browser 112 and, in response to detecting a change in the displayed portion of the webpage, will initiate its updating process. In step 304, URL updating program 300 detects an updated HTML identification attribute that is being rendered at the top of the web browser window. In an example, the user on client device 102 may navigate to a different section of the webpage, URL updating program 300 will recognize this navigation and start detecting an HTML identification attribute for the section currently being viewed by client device 102. URL updating program 300 can dynamically detect the HTML identification attribute that is being rendered at the top of the web browser window.

In step 306, URL updating program 300 determines an updated URI fragment identifier for the content that is being rendered at the top of the web browser window. In step 308, URL updating program 300 appends the updated fragment identifier to the end of the URL in the URL box of the web browser. In an embodiment, URL updating program 300 removes the previous fragment identifier when the updated fragment identifier is accessed in step 308. In an alternative embodiment in step 304, URL updating program 300 may detect the cursor position of client device 102 in web browser 112 and detect the HTML identification attribute that is closest to the cursor. In another embodiment, the URL in the URL box of web browser 112 is only updated when web browser 112 receives a command to copy the URL, which reduces the distraction of having the URL repeatedly changing in the URL box of web browser 112. In an example, URL updating program 300 allows a user on client device 102 to be able to send a URL link to a user on client device 104 and have the URL link correspond to the section of the webpage that is being viewed on web browser 112 of client device 102.

Figure 4:
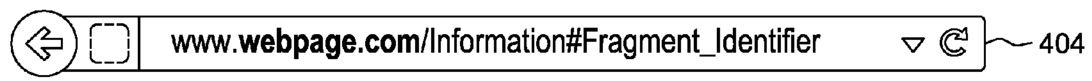
FIG. 4 depicts example images of a URL being appended with a fragment identifier responsive to an updated depiction of a webpage in a web browser in accordance with an embodiment of the present invention.

FIG. 4 depicts a URL updating example 400, which is an exemplary result of URL updating program 300. In this example, client device 102 is accessing a webpage in web browser 112, and is viewing the top of the webpage (image 402). The URL box of the web browser depicted in URL updating example 400 is a representation of web browser 112. The user of client device 102 then scrolls down to the "Fragment Identifier" section of the webpage. URL updating program 300 is notified that the user has scrolled down to the "Fragment Identifier" section of the webpage and then appends the respective fragment identifier (#Fragment_Identifier) to the end of the URL in the URL box. The appended URL is depicted in image 404. Once the URL had been appended with the fragment identifier, the user on client device 102 may copy the URL out of the URL box and send it to a user on client device 104. In this example, the user on client device 104 may activate the URL, and the webpage will open in web browser 116 on client device 104 and the “Fragment Identifier” section of the webpage will be displayed at the top of web browser 116.

FIG. 5 depicts a block diagram of components of client device 500 in accordance with an illustrative embodiment of the present invention. Client device 500 is a representation of client device 102 or client device 104. It should be appreciated that FIG. 5 provides only an illustration of one implementation and does not imply any limitations with regard to the environments in which different embodiments may be implemented. Many modifications to the depicted environment may be made.

Client device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

URL appending program 200 and URL updating program 300 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of client device 102, client device 104, and web server computer 108. In these examples, communications unit 510 includes one or more network interface cards. Communications unit 510 may provide communications through the use of either or both physical and wireless communications links. URL appending program 200 and URL updating program 300 may be downloaded to persistent storage 508 through communications unit 510.

I/O interface(s) 512 allows for input and output of data with other devices that may be connected to client device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., URL appending program 200 and URL updating program 300, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for appending a Uniform Resource Identifier (URI) fragment identifier to a Uniform Resource Locator (URL), the method comprising:

a computer accessing HTML coding for a webpage being displayed in a web browser;

the computer detecting an HTML identification attribute for a section of the webpage that is being rendered within a display window of the web browser;

in response to detecting the HTML identification attribute for the section of the webpage that is being rendered within the display window of the web browser, the computer determining a URI fragment identifier that corresponds to the HTML identification attribute; and in response to determining the URI fragment identifier that corresponds to the HTML identification attribute and in response to receiving a command to copy the URL in a URL box in the web browser, the computer appending the URI fragment identifier to the end of the URL corresponding to the webpage being displayed in the web browser.

2. The method of claim 1, wherein the step of the computer detecting the HTML identification attribute for the section of the webpage that is being rendered within the display window occurs responsive to receiving a command in the web browser to scroll to a new section of the webpage.

3. The method of claim 2, wherein prior to appending the fragment identifier to the end of the URL corresponding to the webpage being displayed in the web browser, the computer removing a previously appended fragment identifier.

4. The method of claim 1, wherein the step of the computer appending the fragment identifier to the end of the URL corresponding to the webpage being displayed in the web browser occurs in a URL box of the web browser.

5. The method of claim 1, wherein the step of detecting an HTML identification attribute for the section of the webpage that is being rendered within the display window of the web browser comprises the computer detecting an HTML identification attribute that is being rendered closest to a top of the display window of the web browser.

6. The method of claim 1, wherein the step of detecting an HTML identification attribute for the section of the webpage that is being rendered within the display window of the web browser comprises the computer detecting an HTML identification attribute that for a section of the webpage is being rendered closest to a cursor position of a user in the display window of the web browser.

7. The method of claim 1, wherein the appending the URI fragment identifier to the end of the URL corresponding to the webpage being displayed in the web browser indicates a browser position of a user on the webpage at a given time.

8. A computer program product for appending a Uniform Resource Identifier (URI) fragment identifier to a Uniform Resource Locator (URL), the computer program product comprising:

- one or more computer-readable storage media and program instructions stored on the one or more computer-readable storage media, the program instructions comprising:
- program instructions to access HTML coding for a webpage being displayed in a web browser;
- program instructions to detect an HTML identification attribute that is being rendered within a display window of the web browser;
- program instructions, responsive to detecting the HTML identification attribute within the display window of the web browser, to determine a URI fragment identifier that corresponds to the HTML identification attribute; and
- program instructions, responsive to determining the URI fragment identifier that corresponds to the HTML identification attribute and responsive to receiving a command to copy the URL in a URL box in the web browser, to append the URI fragment identifier to the end of the URL corresponding to the webpage being displayed in the web browser.

9. The computer program product of claim 8, wherein the program instructions to detect the HTML identification attribute that is being rendered within the display window occurs responsive to receiving a command in the web browser to scroll to a new section of the webpage.

10. The computer program product of claim 8, further comprising program instructions to, prior to appending the fragment identifier to the end of the URL corresponding to the webpage being displayed in the web browser, remove a previously appended fragment identifier.

11. The computer program product of claim 8, wherein the program instructions to append the fragment identifier to the end of the URL corresponding to the webpage being displayed in the web browser occurs in a URL box of the web browser.

12. The computer program product of claim 8, wherein the program instructions to detect an HTML identification attribute that is being rendered within the display window of the web browser, comprises program instructions to detect an HTML identification attribute that is being rendered closest to a top of the display window of the web browser.

13. The computer program product of claim 8, wherein the program instructions to detect an HTML identification attribute that is being rendered within the display window of the web browser, comprises program instructions to detect an HTML identification attribute that is being rendered closest to a cursor position of a user in the display window of the web browser.

14. A computer system for appending a Uniform Resource Identifier (URI) fragment identifier to a Uniform Resource Locator (URL), the computer system comprising:

- one or more computer processors;
- one or more computer-readable storage media;
- program instructions stored on the computer-readable storage media for execution by at least one of the one or more processors, the program instructions comprising:
- program instructions to access HTML coding for a webpage being displayed in a web browser;
- program instructions to detect an HTML identification attribute that is being rendered within a display window of the web browser;
- program instructions, responsive to detecting the HTML identification attribute within the display window of the web browser, to determine a URI fragment identifier that corresponds to the HTML identification attribute; and
- program instructions, responsive to determining the URI fragment identifier that corresponds to the HTML identification attribute and responsive to receive a command to copy the URL in a URL box in the web browser, to append the fragment identifier to the end of the URL corresponding to the webpage being displayed in the web browser.

15. The computer system of claim 14, wherein the program instructions to detect the HTML identification attribute that is being rendered within the display window occurs responsive to receiving a command in the web browser to scroll to a new section of the webpage.

16. The computer system of claim 14, further comprising program instructions to, prior to appending the fragment identifier to the end of the URL corresponding to the webpage being displayed in the web browser, remove a previously appended fragment identifier.

17. The computer system of claim 14, wherein the program instructions to append the fragment identifier to the end of the URL corresponding to the webpage being displayed in the web browser occurs in a URL box of the web browser.

18. The computer system of claim 14, wherein the program instructions to detect an HTML identification attribute that is being rendered within the display window of the web browser, comprises program instructions to detect an HTML identification attribute that is being rendered closest to a top of the display window of the web browser.

19. The computer system of claim 14, wherein the program instructions to detect an HTML identification attribute that is being rendered within the display window of the web browser, comprises program instructions to detect an HTML identification attribute that is being rendered closest to a cursor position of a user in the display window of the web browser.

* * * * *